United States Patent [19]

Van Kesteren

[11] 4,164,617
[45] Aug. 14, 1979

[54] LONG WATERTIGHT CABLE AND SLEEVE JOINT

[75] Inventor: Jacobus P. I. Van Kesteren, Leidschendam, Netherlands

[73] Assignee: N.K.F. Groep B.V., Netherlands

[21] Appl. No.: 904,201

[22] Filed: May 9, 1978

[30] Foreign Application Priority Data

May 27, 1977 [NL] Netherlands .......................... 7705840

[51] Int. Cl.² .............................................. H01B 7/28
[52] U.S. Cl. ........................... 174/23 C; 260/33.6 SB; 260/33.8 SB; 260/37 SB
[58] Field of Search ................. 260/33.6 SB, 33.8 SB; 174/23 R, 23 C

[56] References Cited

U.S. PATENT DOCUMENTS

| 3,845,161 | 10/1974 | Beers | 260/33.6 SB |
| 3,925,277 | 12/1975 | Lampe | 260/33.6 SB |

FOREIGN PATENT DOCUMENTS 7408740  12/1975  Netherlands .

Primary Examiner—Lewis T. Jacobs
Attorney, Agent, or Firm—Norman N. Spain

[57] ABSTRACT

An improved watertight cable is formed by employing as a sealing composition a mixture of a vulcanizable silicone rubber and as a diluent a cycloalkyl benzene the phenyl ring of which may be chlorinated.

9 Claims, No Drawings

LONG WATERTIGHT CABLE AND SLEEVE JOINT

BACKGROUND OF THE INVENTION

The invention relates to a method of manufacturing a long watertight cable or cable joint comprising a number of conductors situated within an outer sheath, in which a liquid or semisolid sealing mixture comprising a vulcanizable silicone rubber and a diluent is provided in the space between the conductors mutually and between the conductors and the outer sheath, which mixture, after vulcanization of the silicone rubber, provides a watertight seal.

Such a method directed to the manufacture of long watertight cables is known from published Netherlands Pat. application No. 7,408,740 in the name of Applicants.

According to the known method, a silicone rubber is used which is vulcanizable under the influence of moisture and which may contain a silicone oil or a rapidly evaporating solvent as a diluent.

It has been found that a diluent which is permanently present in the water tight seal formed after vulcanization of the silicone rubber promotes the desired properties of the material, such as elasticity and moisture tightness.

The known permanent diluent, silicone oil, gives good satisfaction but for practical application has the important disadvantage of being very expensive and in addition causing skin irritation so that special protection measures have to be taken by the operating personnel.

Despite intensive efforts, the art has until now failed to provide diluents which in combination with silicone rubber show the same favorable characteristics as regards adhesion, elasticity and moisture tightness as the known combination of silicone rubber and silicone oil, but which do not have the above-mentioned disadvantages. The usual solvents for silicone resins, or in other words for organopolysiloxanes, as shown, for example, in German Auslegeschrift 1,795,198, failed to meet these requirements.

It is an object of this invention therefore, to provide a diluent for vulcanizable silicone rubber which is less expensive than the silicone oils and is relatively non-irritating to the skin while with the silicon rubber showing the same favorable characteristics as regards adhesion, elasticicity and moisture tightness. This and other advantages of the invention will be apparent from the description that follows:

GENERAL DESCRIPTION OF THE INVENTION

According to the invention, it has been found surprisingly that very good results are achieved if a cyclo-alkylbenzene is used as a diluent the cyclo-alkyl group of which comprises 4–15 carbon atoms and the benzene group of which may be fully or partly chlorinated.

The cyclo-alkyl benzene used in the method according to the invention is readily compatible with silicone rubber, does not exude and together with silicone rubber provides a sealing mixture which after vulcanization engages the conductors and the inner wall of the outer sheath in a moisture-tight manner so that a long watertight cable or sleeve joint is obtained. It is to be noted that the sealing mixture does not adhere to the conductors and the inner wall of the cable so that an optimum flexibility is obtained which is of importance in particular for cables.

Examples of the cycloalkylbenzenes that may be employed are mono-, di, tri-, or tetra- phenylcyclobutane, mono, di, tri or polyphenylcyclooctane, mono, di, tri or polyphenylcyclopentadecane, the acyclic ring portions of which may be substituted by alkyl groups, particularly methyl and ethyl and the benzene ring portions of which may be substituted with up to five chlorine atoms.

Very readily useful cyclo-alkyl benzene compounds are tripropylene benzene, tetrapropylene benzene, chlorinated tripropylene benzene, chlorinated tetrapropylene benzene, and mixtures thereof.

A particularly suitable diluent is technical tetrapropylene benzene which is marketed inter alia by Esso as Escane F. As is known, technical tetrapropylene benzene is obtained by alkylating benzene with technical tetrapropylene which is a mixture of cyclisized olefins with an average number of carbon atoms per molecule of approximately 12. The above-mentioned Escane F is the alkylation product of benzene with a mixture of cyclizized olefins which contains approximately 77% by weight of $C_{12}$ olefins, 10% by weight of $C_{11}$ olefins, 4% by weight of $C_{10}$ olefins and 9% by weight of olefins having 13 or more carbon atoms. The boiling range is between approximately 270°–300° C. The viscosity at 20° C. is approximately 10c St, at 60° C. approximately 4 c St. Tetrapropylene benzene and more generally dodecylbenzene is a known starting product for the preparation of detergents which are obtained after sulfonation of the starting product.

It should be pointed out that non-cyclic alkylbenzene, for example dodecylbenzene having a straight or branched alkyl chain are not suitable for use as a diluent of silicone rubber in the method according to the invention.

The weight ratio of cyclo alkyl benzene and the silicone rubber may vary within wide limits and generally is between the limits 1:2 and 20:1. A high value of the weight ratio cyclo alkyl benzene and silicone rubber results in a comparatively low degree of viscosity of the sealing mixture. As a result of this the mixture flows better and will easily fill the space between the firmly intertwined conductors of a cable which often is at a minimum.

In cable joints, sometimes termed sleeve joints, the conductors of the cable ends to be connected are untwisted and electricaly connected together. As is known, for this purpose the insulation jacket is removed from the end part of each conductor and the exposed parts of the conductors in one cable are connected electrically to those of the other cable, for example, by means of conductive clamps. An outer sheath or joint housing manufactured, for example, from cast iron or synthetic resin is provided over the assembly. The sleeve housing has a filling aperture for introduction of the sealing mixture.

In such a known cable joint the mutual distance between the interconnected conductors is generally larger than the conductor specing in the cable itself. In this case, the sealing mixture employed may have a comparatively high degree of viscosity and a low weight ratio of cycloalkylbenzene to silicone rubber is used.

In a preferred embodiment of the method according to the invention, the weight ratio of the cyclo alkyl benzene and the silicone rubber is between the limits 3:1 and 5:1. The silicone rubber used in the method according to the invention is of the conventional type and may consist, for example, of a two-components system formed by an organo polysiloxane and a hardener, for example an alkoxy silicate. Readily useful in particular are the silicone rubbers which vulcanize under the influence of moisture, as described, for example, in the above Netherlands Patent Application and German Ausleglschrift. Such silicone rubbers are commercially available, for example the silcone rubber of Dow Corning Corp. USA obtainable as Silastic 732 RTV. They usually consist of a mixture of diorganopolysiloxane, such as polydimethylsiloxane, a filler, for example pyrogenic silicic acid, or chalk, a material which produces cross-linking, for example ethyl silicate and a vulcanization catalyst. Examples of such catalysts are tetraisopropoxy titanate and dibutyl tin dilaurate.

It has been found that the best results are obtained if an extra quantity of filler is added to the commercial product, for example, pyrogenic $SiO_2$, chalk or starch in a weight ratio of 50-200% by weight calculated on the quantity of silicone rubber.

In the cables obtained according to the method of the invention, the conductors which are situated within the outer sheath and together are sometimes referred to as "cable soul" may be arranged in the usual manner. For example, the cable soul may be constructed of twisted insulated conductors in the form of, for example, star groups or pairs of twisted bundles of conductors, as is generally the case in telecommunication cables. The insulation of the conductors consists, for example, of polyethylene or polyvinyl chloride. As stated above, the sealing mixture does not adhere to the conductors, in particular the insulation of the conductors, and does not attack them either.

The provision of the sealing mixture usually occurs during the manufacture of the cable. For example, during the twisting of the individual insulating wires from which the cable soul is constructed, the liquid sealing mixture is pressed between and on the wires by means of a piston pump and an outer sheath of, for example, synthetic material or lead is simultaneously or subsequently provided.

In a blockwise provision of the sealing mass in which the whole cable is not provided with the sealing mixture but parts situated at a regular distance from each other, said mixture may also be provided in layers. Upon twisting of conductors or conductor bundles, a quantity of sealing mixture is also provided when a layer of conductors is provided on the preceding layer. After vulcanization, the layers of the sealing mixture provided in this manner constitute a coherent assembly.

When a silicone rubber is used which is vulcanizable under the influence of moisture, extra moisture may be added, if necessary, by spraying water on the twisted conductors. Of course this treatment is carried out before the outer sheath is provided.

As already described above, in cable joints the outer sheath or sleeve housing provided around the interconnected conductors is filled with the sealing mixture via a filling aperture present therein and fully fills the space between the interconnected conductors and between the conductors and outer sheath. The sealing mixture used in the cable joints preferably does not contain silicone rubber which is vulcanizable with moisture because the moisture necessary for vulcanization might corrode the connection terminals of the various interconnected conductors. In this case a two-components silicone rubber is used.

The sealing mixture used in the method according to the invention is a new composition of substances. The invention also relates to this new mixture of silicone rubber and cyclo alkyl benzene which can be obtained in a simple manner namely by mixing the composing ingredients.

The invention will be described in greater detail with reference to the following specific example.

EXAMPLE 20 kg of technical tetrapropylene benzene which is marketed by Esso as Escane F. and 15 kg of chalk are added to 10 kg of silicone rubber which can be vulcanized under the influence of moisture and is marketed by Dow Corning as Silastic RTV 732.

The substances are mixed in a rotating cylindrical container to which steel balls have been added. The resulting sealing mixture is provided as follows blockwise in a telephone cable.

The cable soul of a telephone cable consisting of 150 star groups of conductors each consisting of a copper wire having a diameter of 0.5 mm and an insulation layer of polyethylene with a thickness of 0.32 mm was constructed by providing around a core consisting of 3 star groups layers of successively 9, 15, 21, 27, 34 and 41 star groups having alternately left and right screw thread.

A foil of linear polyester is wound in an open spiral around each layer, the outermost layer excepted.

On the core and on each next layer of star groups such a quantity of the above mixture was provided at regular distances (1m) over a length of approximately 10 cm that the space between the conductors was fully filled.

A foil consisting of a linear polyester was wound with overlap around the cable soul and then a sheath was extruded around the cable soul.

During the dispensing of the filling mixture into the space between the conductors and the winding of the linear polyester foil, the normal atmosphere in the manufacturing room was allowed to contact the filling mixture. The moisture, which is present in this atmosphere together with the moisture which is present in the air between the conductors in the non filled parts of the cable soul causes vulcanization of the silicone rubber in the filling mixture.

In order to examine the effect of the sealing, a section of the cable thus obtained was connected in the horizontal position with a vertically arranged tube containing water up to a height of 1 m above the cable section. It was found that after 6 weeks the water had penetrated only one of the barriers formed by the sealing mixture.

What is claimed is:

1. In a method of manufacturing a longitudinally watertight cable or cable joint comprising a number of conductors situated within an outer sheath, in which a liquid or semi-solid sealing mixture comprising a vulcanizable silicone rubber and a diluent is provided in the space between the conductors mutually and between the conductors and the outer sheath, which mixture, after vulcanization of the silicone rubber, constitutes a watertight seal, the improvement wherein a cycloalkyl benzene is used as a diluent the cyclo alkyl group of which contains 8-15 carbon atoms and the benzene group of which may be fully or partly chlorinated.

2. A method as claimed in claim 1, wherein tripropylene benzene, tetrapropylene benzene, chlorinated tripropylene benzene, chlorinated tetrapropylene benzene or mixtures thereof is used as the diluent.

3. A method as claimed in claim 2, wherein technical tetrapropylene benzene is used as the diluent.

4. A method as claimed in claim 1, wherein the weight ratio of the silicone rubber and cyclo alkyl benzene in the sealing mixture is from 3:1 to 5:1.

5. The method as claimed in claim 1, wherein a filler is added to the sealing mixture of silicone rubber and cycloalkyl benzene is a quantity of 50–200% by weight calculated on the quantity of silicone rubber.

6. A sealing mixture suitable for use in the method as claimed in claim 1 comprising a mixture of a vulcanizable silicone rubber and a cycloalkyl benzene wherein the cycloalkyl moiety is of 8–15 carbons and the benzene ring may be chlorinated.

7. A sealing mixture as claimed in claim 6, characterised in that the cycloalkyl benzene is selected from the group consisting of tripropylene benzene, tetrapropylene benzene, chlorinated tripropylene benzene, chlorinated tetrapropylene benzene of a mixture thereof.

8. A sealing mixture as claimed in claim 7, characterized in that the cycloalkyl benzene is technical tetrapropylene benzene.

9. A long watertight cable or cable joint obtained by the method of claim 1.

* * * * *

UNITED STATES PATENT OFFICE
CERTIFICATE OF CORRECTION

Patent No. 4,164,617  Dated August 14, 1979

Inventor(s) Jacobus P.I. Van Kesteren

It is certified that error appears in the above-identified patent and that said Letters Patent are hereby corrected as shown below:

Col. 4 line 64, "cyclo alkyl" should read "cycloalkyl"

Col. 5 line 6, "cyclo alkyl" should read "cycloalkyl"

Col 6 line 8, After "benzene" change "of" to -- and --.

Signed and Sealed this

Thirteenth Day of October 1981

[SEAL]

Attest:

Attesting Officer

GERALD J. MOSSINGHOFF

Commissioner of Patents and Trademarks